US009170607B2

(12) United States Patent
Bose et al.

(10) Patent No.: US 9,170,607 B2
(45) Date of Patent: Oct. 27, 2015

(54) METHOD AND APPARATUS FOR DETERMINING THE PRESENCE OF A DEVICE FOR EXECUTING OPERATIONS

(75) Inventors: Raja Bose, Mountain View, CA (US); Keun-Young Park, Santa Clara, CA (US); Jörg Brakensiek, Mountain View, CA (US); Jonathan Lester, San Francisco, CA (US)

(73) Assignee: Nokia Technologies Oy, Espoo (FI)

( * ) Notice: Subject to any disclaimer, the term of this patent is extended or adjusted under 35 U.S.C. 154(b) by 120 days.

(21) Appl. No.: 13/274,820

(22) Filed: Oct. 17, 2011

(65) Prior Publication Data

US 2013/0093713 A1    Apr. 18, 2013

(51) Int. Cl.
*G06F 3/045* (2006.01)
*G06F 1/16* (2006.01)
(Continued)

(52) U.S. Cl.
CPC ............. *G06F 1/1632* (2013.01); *G01S 5/0072* (2013.01); *G06F 3/03547* (2013.01); *G06F 3/0416* (2013.01); *G06F 3/0481* (2013.01); *G06F 3/0487* (2013.01); *G06F 3/0488* (2013.01); *G06F 3/04883* (2013.01); *H04M 1/7253* (2013.01); *H04M 1/72533* (2013.01); *H04M 2250/04* (2013.01); *H04M 2250/12* (2013.01); *H04M 2250/22* (2013.01)

(58) Field of Classification Search
CPC ......... G06F 3/044; G06F 3/045; G06F 3/041; G06F 3/04883; G06F 3/0487; G06F 3/0416; G06F 1/1632; G06F 3/03547; G06F 3/0488; G06F 3/0481; G01S 5/0072; H04M 1/7253; H04M 2250/12; H04M 2250/04
USPC ................................. 345/173–174
See application file for complete search history.

(56) References Cited

U.S. PATENT DOCUMENTS 5,734,371 A *   3/1998  Kaplan ......................... 345/158
2005/0251800 A1* 11/2005  Kurlander et al. ............ 717/174
(Continued)

FOREIGN PATENT DOCUMENTS

WO    WO 2008/132693  A2    11/2008
WO    WO 2009/085777  A2     7/2009

OTHER PUBLICATIONS

International Search Report and Written Opinion of the Searching Authority for Application No. PCT/FI2012/050969; dated Jan. 24, 2013.
Neng-Hao Yu, et al.; TUIC: Enabling Tangible Interaction on Capacitive Multi-touch Display; CHI 2011, May 7-11, 2011, Vancouver, BC, Canada; pp. 1-10.
(Continued)

*Primary Examiner* — Towfiq Elahi
(74) *Attorney, Agent, or Firm* — Alston & Bird LLP

(57) ABSTRACT

An apparatus, method, and computer program product are described that can detect the presence of a tangible object without using computer vision. The apparatus receives a signal from a device proximate the apparatus, where the signal includes at least one of a proximity component and an orientation component, and also receives a touch input from the associated display. The apparatus then determines whether there is an association between the signal and the touch input based on the proximity component and/or the orientation component. If the signal and the touch input are associated, it is an indication that the device is disposed on the display, operations may be executed, such as to facilitate interaction between the apparatus and the device. As a result, any object capable of providing a signal having a proximity component or an orientation component can be detected (e.g., without the use of cameras or fiducial markers).

22 Claims, 11 Drawing Sheets

(51) Int. Cl.

| | |
|---|---|
| *G01S 5/00* | (2006.01) |
| *H04M 1/725* | (2006.01) |
| *G06F 3/0488* | (2013.01) |
| *G06F 3/0354* | (2013.01) |
| *G06F 3/0487* | (2013.01) |
| *G06F 3/0481* | (2013.01) |
| *G06F 3/041* | (2006.01) |

(56) References Cited

U.S. PATENT DOCUMENTS

| | | | |
|---|---|---|---|
| 2007/0003061 A1* | 1/2007 | Jung et al. | 380/270 |
| 2009/0215397 A1* | 8/2009 | Thorn et al. | 455/41.2 |
| 2010/0218249 A1* | 8/2010 | Wilson et al. | 726/19 |
| 2010/0302144 A1* | 12/2010 | Burtner et al. | 345/157 |
| 2011/0088002 A1 | 4/2011 | Freer | |
| 2011/0177785 A1* | 7/2011 | Rekimoto et al. | 455/41.3 |

OTHER PUBLICATIONS

Koene, Philip, et al; DropTheBeat—a Tangible user interface for cloud computing resources; CHI 2011, May 7-11, 2011, Vancouver, BC, Canada; pp. 1-6.

Wiethoff, Alexander, et al.; SoloFind: Chains of Interactions with a Mobile Retail Experience System; May 7-12, 2011, Vancouver, BC, Canada; pp. 1-6.

Nordby, Kjetil, et al,; Designing tangible interaction using short-range RFID; 2010 FORMakademisk; vol. 3, Nr. 2; pp. 77-96.

Transcript of YouTube Video (http://www.youtube.com/watch?v=Zxk_WywMTzc#t=4m38s); 9 minutes, 58 seconds total duration; Transcript portion from 4 minutes, 38 seconds to 5 minutes, 19 seconds; Last Accessed Dec. 7, 2011.

Up Close with Microsoft's Next-Generation Surface Touchscreen Tables (Video); [online] [retrieved Oct. 06, 2011]. Retrieved from the Internet: http://venturebeat.com/2011/01/09/up-close-with-tnicrosofts-next-aeneration- surface-touchscreen-tables-video-interview/>; dated Jan. 9, 2011; 5 pp. Examiner.

* cited by examiner

METHOD AND APPARATUS FOR DETERMINING THE PRESENCE OF A DEVICE FOR EXECUTING OPERATIONS

TECHNOLOGICAL FIELD

Embodiments of the present invention relate generally to determining the presence of a device proximate an apparatus with a touch screen display for executing operations, such as allowing interaction between the device and the apparatus via the display. In particular, embodiments of the present invention relate to an apparatus and method for detecting the device based on an association between a signal received from the device and a touch input received at the display, rather than through computer vision techniques.

BACKGROUND

As digital information becomes more prevalent in society, the need to access and share such information is constantly growing. Devices for capturing, creating, manipulating, and/or storing such information abound, from digital cameras to cellular phones to laptop computers and other personal mobile devices.

In addition to being able to access information from such devices, users also desire to share information between devices. For example, a user may want to display pictures taken using a digital camera on a portable device with a larger display to make the images easier to see and manipulate. Similarly, a user may wish to view a movie downloaded on the user's cellular phone on a mobile device with a larger display.

Accordingly, it may be desirable to provide an improved mechanism for detecting and establishing a connection with a device for the purpose of receiving and interacting with data from the device.

BRIEF SUMMARY OF EXAMPLE EMBODIMENTS

Accordingly, embodiments of an apparatus, method, and computer program product are described that can detect the presence of a device without using computer vision, but rather by determining whether a signal received from the device and a touch input received at a display are associated. In particular, embodiments of an apparatus for determining the presence of a device for executing operations may include at least one processor and at least one memory including computer program code. The at least one memory and the computer program code may be configured to, with the processor, cause the apparatus to receive a signal from a device proximate the apparatus and to receive a touch input from a display associated with the apparatus. The signal may include at least one of a proximity component or an orientation component. A determination may then be made as to whether there is an association between the signal and the touch input based on at least one of the proximity component or the orientation component, wherein the association is indicative of the device being disposed on the display. An operation may then be executed based on the determination that the signal and the touch input are associated.

In some cases, the signal received from the device may be an RF signal. The memory and computer program code may be configured to, with the processor, cause the apparatus to transmit an inquiry signal, and the signal received from the device may be transmitted by the device in response to the inquiry signal. The inquiry signal may be transmitted in response to the receipt of the touch input. In other cases, the touch input may be received in response to the receipt of the signal from the device.

The touch input may comprise detection of a force applied to the display. Additionally or alternatively, the touch input may comprise information received from a capacitive or resistive touch sensor associated with the display. In some instances, the signal received from the device may include an identity component, and the memory and computer program code may be configured to, with the processor, cause the apparatus to exchange data with the device at least partly based on the identity component.

The memory and computer program code may further be configured to, with the processor, cause the apparatus to determine a relative orientation of the display with respect to a known magnetic field. The orientation component may comprise an indication of a relative orientation of the device with respect to the known magnetic field, and the memory and computer program code may be configured to, with the processor, cause the apparatus to determine an orientation of the device with respect to the display based on a comparison of the relative orientation of the display with the relative orientation of the device.

In other embodiments, a method and a computer program product are provided for determining the presence of a device for executing operations by receiving a signal from a device proximate an apparatus and receiving a touch input from a display associated with the apparatus. The signal may include at least one of a proximity component or an orientation component. A determination may be made, via a processor, that there is an association between the signal and the touch input based on at least one of the proximity component or the orientation component, with the association being indicative of the device being disposed on the display. An operation may be executed based on the determination that the signal and the touch input are associated.

In some cases, an inquiry signal may be transmitted, and the signal received from the device may be transmitted by the device in response to the inquiry signal. The inquiry signal may be transmitted in response to the receipt of the touch input. Alternatively, the touch input may be received in response to the receipt of the signal from the device.

In still other cases, a relative orientation of the display may be determined with respect to a known magnetic field. The orientation component may comprise an indication of a relative orientation of the device with respect to the known magnetic field, and an orientation of the device with respect to the display may be determined based on a comparison of the relative orientation of the display with the relative orientation of the device.

In still other embodiments, an apparatus is provided for determining the presence of a device for executing operations that includes means for receiving a signal from a device proximate an apparatus and means for receiving a touch input from a display associated with the apparatus. The signal may include at least one of a proximity component or an orientation component. The apparatus may further include means for determining whether there is an association between the signal and the touch input based on at least one of the proximity component or the orientation component, with the association being indicative of the device being disposed on the display. Furthermore, the apparatus may include means for executing an operation based on the determination that the signal and the touch input are associated.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
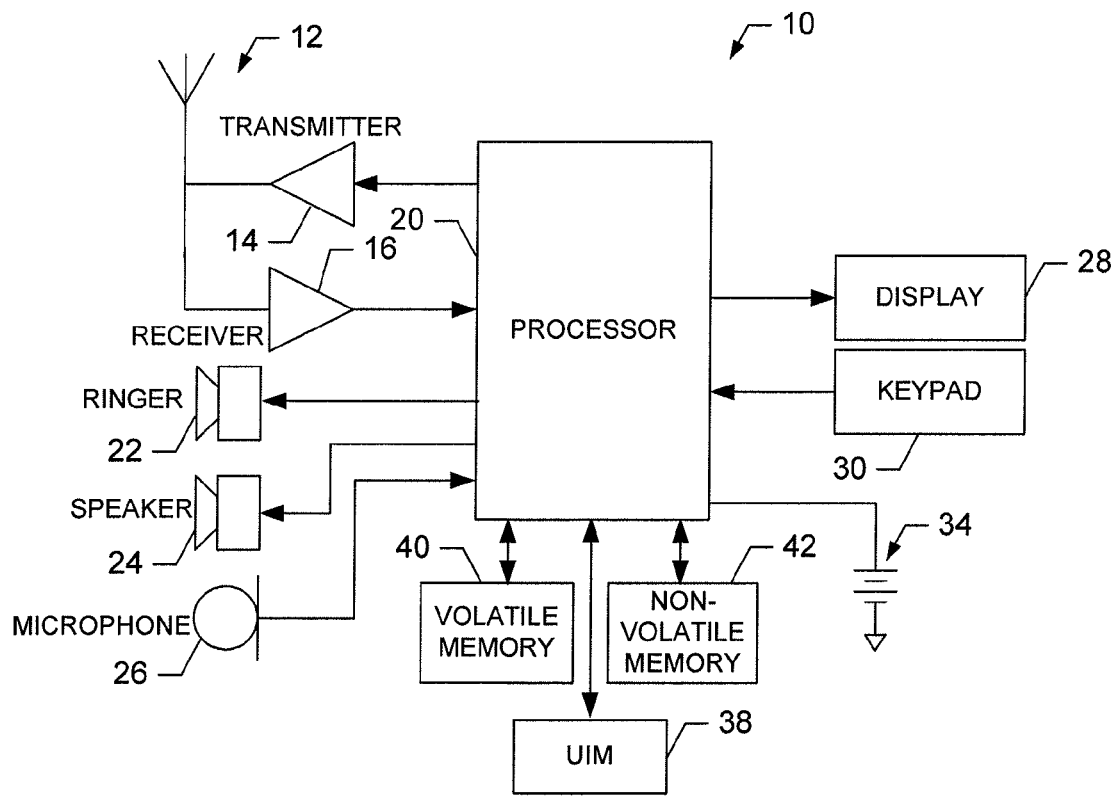
FIG. 1 illustrates one example of a communication system according to an example embodiment of the present invention.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), can be differentiated from a "computer-readable transmission medium," which refers to an electromagnetic signal.

A tangible user interface is a form of user interface in which a user interacts with digital information using the physical environment. For example, a touch display, which may take the form of a table top, for example, may be configured to allow a user to interact with data related to an object (e.g., a "tangible object") placed on the display surface. In other words, the display may be able to "see" what the tangible object is, retrieve data about the tangible object (e.g., through a connection with a network such as the Internet, through a wireless connection with the tangible object itself, from a memory associated with the display, or from some other remote storage location), present the data via the display, and allow the user to view, modify, manipulate, and otherwise interact with the data.

Often, such displays use "computer vision" to detect and identify a tangible object with which to interact. For example, cameras may be provided on a housing of the display or integral to the display itself, and the cameras may be configured to detect reflections of infrared (IR) light from objects that contact or come in close proximity to the display. Thus, placement fiducial marker or optical tag on any object, from a wine glass to a cellular telephone, allows the display to recognize the object as a tangible object via the reflection of IR light off the fiducial marker. The fiducial marker may include different aspects of information regarding the tangible object, including what the object is and how to communicate with the object.

Taking the example of a cellular telephone, the cellular telephone may be configured with a fiducial marker on its housing or projected on the phone's display that includes information identifying the device as a cellular telephone and indicating a Bluetooth address or other wireless communication protocol that the apparatus embodying the display may use to communicate with the cellular telephone. Thus, when the cellular telephone is placed on the display and the fiducial marker is read, the display may present options to a user for interaction with the display and/or the cellular telephone. For example, the display may allow the user to access and view via the display pictures stored on the cellular phone. The user may be able to enlarge, rotate, or crop selected photos by providing appropriate touch gestures to the display.

The components that allow "computer vision" to take place often dictate that the display be a large surface, such as a table. The size of such displays increases the cost of an apparatus and makes portability of the apparatus difficult.

Accordingly, embodiments of the apparatus, method, and computer program product described below provide for an apparatus that can detect the presence of a tangible object without using computer vision, such that a smaller-size display surface may be used (e.g., a tablet or laptop computer). Embodiments of the apparatus, method, and computer program product described below receive a signal from a device proximate the apparatus, where the signal includes at least one of a proximity component and an orientation component, and also receive a touch input from the associated display. The apparatus is then configured to determine whether there is an association between the signal and the touch input based on at least one of the proximity component or the orientation component. If the signal and the touch input are associated, it is an indication that the device is disposed on the display (e.g., the placement of the device on the display is the cause of the touch input). Operations may then be executed based on the determination that the signal and the touch input are associated. For example, interaction between the apparatus and the device may then be allowed based on the determination. As a result, any object capable of providing a signal having a proximity component or an orientation component can be detected (e.g., without the use of cameras or fiducial markers), and a user's interaction with the detected object may be facilitated.

FIG. 1, which provides one example embodiment, illustrates a block diagram of a mobile terminal 10 that would benefit from embodiments of the present invention. It should be understood, however, that the mobile terminal 10 as illustrated and hereinafter described is merely illustrative of one type of device that may benefit from embodiments of the present invention and, therefore, should not be taken to limit the scope of embodiments of the present invention. As such, although numerous types of mobile terminals, such as portable digital assistants (PDAs), mobile telephones, pagers, mobile televisions, gaming devices, laptop computers, cameras, tablet computers, touch surfaces, wearable devices, video recorders, audio/video players, radios, electronic books, positioning devices (e.g., global positioning system (GPS) devices), or any combination of the aforementioned, and other types of voice and text communications systems, may readily employ embodiments of the present invention, other devices including fixed (non-mobile) electronic devices may also employ some example embodiments.

The mobile terminal 10 may include an antenna 12 (or multiple antennas) in operable communication with a transmitter 14 and a receiver 16. The mobile terminal 10 may further include an apparatus, such as a processor 20 or other processing device (e.g., processor 70 of FIG. 2), which controls the provision of signals to and the receipt of signals from the transmitter 14 and receiver 16, respectively. The signals may include a proximity component and/or an orientation component, as described below. The signals may further include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as evolved UMTS Terrestrial Radio Access Network (E-UTRAN), with fourth-generation (4G) wireless communication protocols (e.g., Long Term Evolution (LTE) or LTE-Advanced (LTE-A) or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks.

In some embodiments, the processor 20 may include circuitry desirable for implementing audio and logic functions of the mobile terminal 10. For example, the processor 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The processor 20 thus may also include the functionality to convolutionally encode and interleave message and data prior to modulation and transmission. The processor 20 may additionally include an internal voice coder, and may include an internal data modem. Further, the processor 20 may include functionality to operate one or more software programs, which may be stored in memory. For example, the processor 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the processor 20. The user input interface, which allows the mobile terminal 10 to receive data, may include any of a number of devices allowing the mobile terminal 10 to receive data, such as a keypad 30, a touch screen display (display 28 providing an example of such a touch screen display) or other input device. In embodiments including the keypad 30, the keypad 30 may include the conventional numeric (0-9) and related keys (#, *), and other hard and soft keys used for operating the mobile terminal 10. Alternatively or additionally, the keypad 30 may include a conventional QWERTY keypad arrangement. The keypad 30 may also include various soft keys with associated functions. In addition, or alternatively, the mobile terminal 10 may include an interface device such as a joystick or other user input interface. Some embodiments employing a touch screen display, as described further below, may omit the keypad 30 and any or all of the speaker 24, ringer 22, and microphone 26 entirely. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The memories may store any of a number of pieces of information, and data, used by the mobile terminal 10 to implement the functions of the mobile terminal 10.

In some embodiments, the mobile terminal 10 may also include a camera or other media capturing element (not shown) in order to capture images or video of objects, people and places proximate to the user of the mobile terminal 10. However, the mobile terminal 10 (or even some other fixed terminal) may also practice example embodiments in connection with images or video content (among other types of content) that are produced or generated elsewhere, but are available for consumption at the mobile terminal 10 (or fixed terminal).

An example embodiment of the invention will now be described with reference to FIG. 2, in which certain elements of an apparatus 50 for determining the presence of a device for executing operations based on an association between signals received from the device and a touch input to the display are depicted. The apparatus 50 of FIG. 2 may be employed, for example, in conjunction with the mobile terminal 10 of FIG. 1. However, it should be noted that the apparatus 50 of FIG. 2 may also be employed in connection with a variety of other devices, both mobile and fixed, and therefore, embodiments of the present invention should not be limited to application on devices such as the mobile terminal 10 of FIG. 1. For example, the apparatus 50 may be employed on a personal computer, a tablet, a mobile touch screen display, or other user terminal. Moreover, in some cases, the apparatus 50 may be on a fixed device such as server or other service platform and the content may be presented (e.g., via a server/client relationship) on a remote device such as a user terminal (e.g., the mobile terminal 10) based on processing that occurs at the fixed device.

Figure 2:
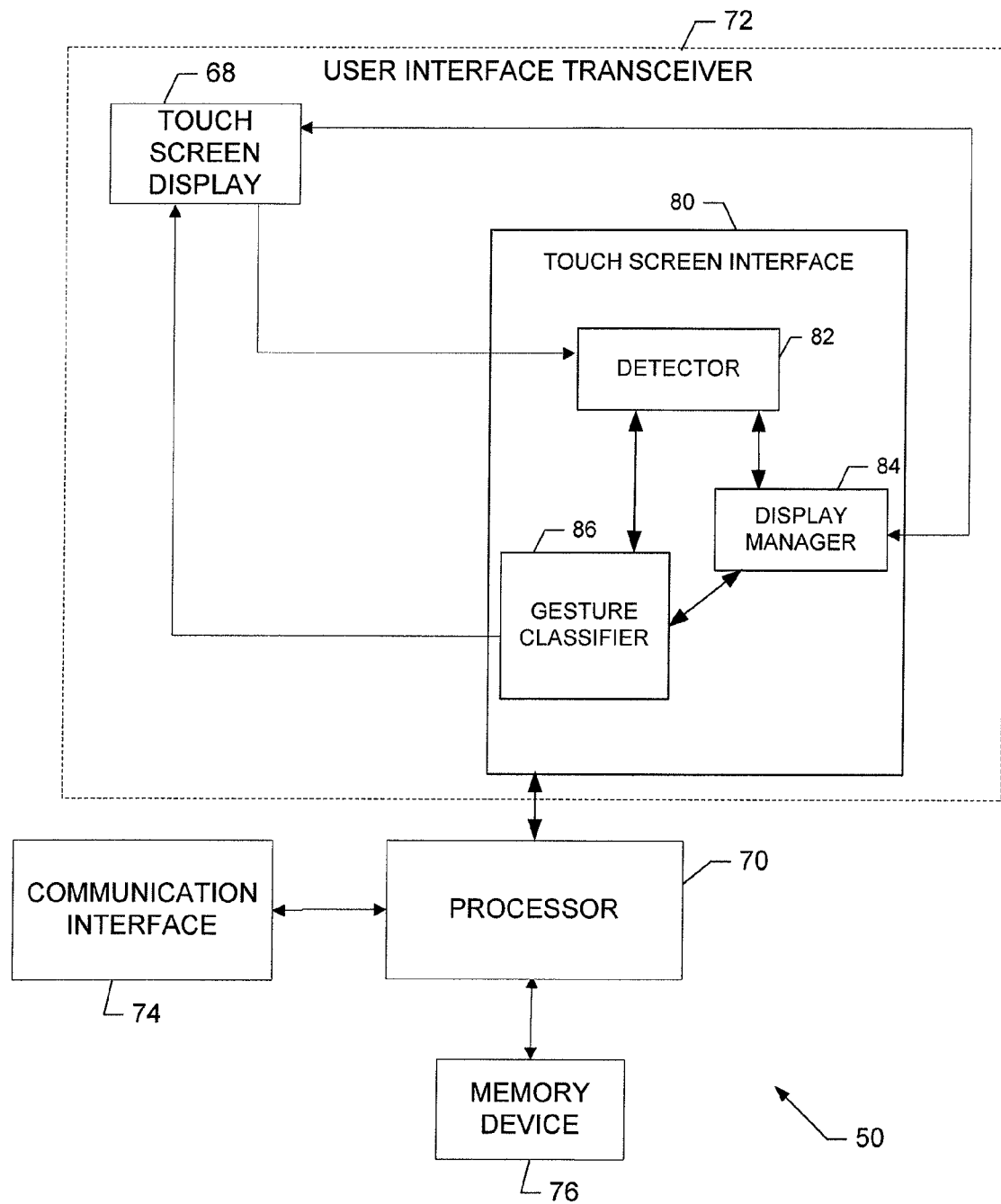
FIG. 2 illustrates a schematic block diagram of an apparatus for determining the presence of a device for interaction via a display according to an example embodiment of the present invention.

It should also be noted that while FIG. 2 illustrates one example of a configuration of an apparatus for determining the presence of a device for executing operations, numerous other configurations may also be used to implement embodiments of the present invention. As such, in some embodiments, although devices or elements are shown as being in communication with each other, hereinafter such devices or elements should be considered to be capable of being embodied within a same device or element and, thus, devices or elements shown in communication should be understood to alternatively be portions of the same device or element.

Referring now to FIG. 2, the apparatus 50 for determining the presence of a device for executing operations based on an association between a signal received from the device and a touch input to the display may include or otherwise be in communication with a processor 70, a user interface transceiver 72, a communication interface 74, and a memory device 76. In some embodiments, the processor 70 (and/or co-processors or any other processing circuitry assisting or otherwise associated with the processor 70) may be in communication with the memory device 76 via a bus for passing information among components of the apparatus 50. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device like the processor 70). The memory device 76 may be configured to store information, data, content, applications, instructions, or the like for enabling the apparatus to carry out various functions in accordance with an example embodiment of the present invention. For example, the memory device 76 could be configured to buffer input data for processing by the processor 70. Additionally or alternatively, the memory device 76 could be configured to store instructions for execution by the processor 70.

The apparatus 50 may, in some embodiments, be a mobile terminal (e.g., mobile terminal 10) or a fixed communication device or computing device configured to employ an example embodiment of the present invention. However, in some embodiments, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the present invention on a single chip or as a single "system on a chip." As such, in some cases, a chip or chipset may constitute means for performing one or more operations for providing the functionalities described herein.

The processor 70 may be embodied in a number of different ways. For example, the processor 70 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 70 may include one or more processing cores configured to perform independently. A multi-core processor may enable multiprocessing within a single physical package. Additionally or alternatively, the processor 70 may include one or more processors configured in tandem via the bus to enable independent execution of instructions, pipelining and/or multithreading.

In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to an embodiment of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal or network device) adapted for employing an embodiment of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network. Additionally or alternatively, the communication interface 74 may include the circuitry for interacting with the antenna(s) to cause transmission of signals via the antenna(s) or to handle receipt of signals received via the antenna(s). For example, the communication interface 74 may include one or more antenna(s) configured to receive signals, such as radio frequency (RF) signals, Bluetooth Low Energy (LE) signals, or other signals via Near Field Communication (NFC) protocol, as described in greater detail below. In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface transceiver 72 may be in communication with the processor 70 to receive an indication of a user input and/or to cause provision of an audible, visual, mechanical or other output to the user. As such, the user interface transceiver 72 may include, for example, a keyboard, a mouse, a joystick, a display, a touch screen(s), touch areas, soft keys, a microphone, a speaker, or other input/output mechanisms. Alternatively or additionally, the processor 70 may comprise user interface circuitry configured to control at least some functions of one or more user interface elements such as, for example, a speaker, ringer, microphone, display, and/or the like. The processor 70 and/or user interface circuitry comprising the processor 70 may be configured to control one or more functions of one or more user interface elements through computer program instructions (e.g., software and/or firmware) stored on a memory accessible to the processor 70 (e.g., memory device 76, and/or the like).

In an example embodiment, the apparatus 50 may include or otherwise be in communication with a touch screen display 68 (e.g., the display 28). In different example cases, the touch screen display 68 may be a two dimensional (2D) or three dimensional (3D) display. The touch screen display 68 may be embodied as any known touch screen display. Thus, for example, the touch screen display 68 could be configured to enable touch recognition by any suitable technique, such as resistive, capacitive, infrared, strain gauge, surface wave, optical imaging, dispersive signal technology, acoustic pulse recognition, and/or other techniques. The user interface transceiver 72 may be in communication with the touch screen display 68 to receive touch inputs at the touch screen display 68 and to analyze and/or modify a response to such indications based on corresponding user actions that may be inferred or otherwise determined responsive to the touch inputs.

In this regard, various indications of touch inputs may be received as a result of touch events at the touch screen display 68. For example, a force indication may be received, which is indicative of the amount of force applied due to contact with the touch screen display 68. Alternatively or additionally, a position indication may be received (e.g., x-, y-coordinates) that describes the location of the contact.

Although the touch input may be the result of contact with or proximity to the touch screen display, the touch input may or may not be related to the presence of a device with which the apparatus is to interact. For example, a user may apply a touch input by placing a device capable of interaction with the apparatus, such as a cellular telephone, on a surface of the display. As another example, however, the user may apply a touch input by placing some other object that is not capable of communication with the display on the display surface, such as a book or a cup. By receiving signals from a device within a certain distance from the apparatus (and, by extension, within a certain distance from the display) and determining whether the signal received is associated with the object causing the touch input, the apparatus can determine that the object applying the input is in fact a tangible object with which the user can interact via the display.

With continued reference to FIG. 2, in an example embodiment, the apparatus 50 may include a touch screen interface 80. The touch screen interface 80 may, in some instances, be a portion of the user interface transceiver 72. However, in some alternative embodiments, the touch screen interface 80 may be embodied as the processor 70 or may be a separate entity controlled by the processor 70. As such, in some embodiments, the processor 70 may be said to cause, direct or control the execution or occurrence of the various functions attributed to the touch screen interface 80 (and any components of the touch screen interface 80) as described herein. The touch screen interface 80 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the touch screen interface 80 as described herein. Thus, in examples in which software is employed, a device or circuitry (e.g., the processor 70 in one example) executing the software forms the structure associated with such means.

The touch screen interface 80 may be configured to receive an input in the form of a touch event at the touch screen display 68. As such, the touch screen interface 80 may be in communication with the touch screen display 68 to receive user inputs at the touch screen display 68 and to modify a response to such inputs based on corresponding user actions that may be inferred or otherwise determined responsive to the inputs. Following recognition of a touch event, the touch screen interface 80 may be configured to determine a classification of the touch event and provide a corresponding function based on the touch event in some situations.

In some embodiments, the touch screen interface 80 may include a detector 82, a display manager 84, and a gesture classifier 86. Each of the detector 82, the display manager 84, and the gesture classifier 86 may be any device or means embodied in either hardware or a combination of hardware and software configured to perform the corresponding functions associated with the detector 82, the display manager 84, and the gesture classifier 86, respectively, as described herein. In an exemplary embodiment, each of the detector 82, the display manager 84, and the gesture classifier 86 may be controlled by or otherwise embodied as the processor 70.

The detector 82 may be in communication with the touch screen display 68 to receive user inputs in order to recognize and/or determine a touch event based on each input received at the detector 82. A touch event may be defined as a detection of an object, such as a stylus, finger, pen, pencil, cellular telephone, digital camera, or any other mobile device (including the mobile terminal 10 shown in FIG. 1) or object, coming into contact with a portion of the touch screen display in a manner sufficient to register as a touch. In this regard, for example, a touch event could be a detection of pressure on the screen of the touch screen display 68 above a particular pressure threshold over a given area. Subsequent to each touch event, the detector 82 may be further configured to pass along the data corresponding to the touch event (e.g., location of touch, length of touch, number of objects touching, touch pressure, touch area, speed of movement, direction of movement, length of delay, frequency of touch, etc.) to the gesture classifier 86 for gesture classification. As such, the detector 82 may include or be in communication with one or more force sensors configured to measure the amount of touch pressure (e.g., force over a given area) applied as a result of a touch event, as an example.

The gesture classifier 86 may be configured to recognize and/or determine a corresponding classification of a touch event. In other words, the gesture classifier 86 may be configured to perform gesture classification to classify the touch event as any of a number of possible gestures. Some examples of recognizable gestures may include a touch, multi-touch, placement, stroke, character, symbol, shape, swipe, pinch event (e.g., a pinch in or pinch out), and/or the like.

A touch may be defined as a touch event that impacts a single area (without or with minimal movement on the surface of the touch screen display 68) and then is removed. A multi-touch may be defined as multiple touch events sensed concurrently (or nearly concurrently). A placement event may be defined as a touch even that is not removed or is maintained for a certain period of time (e.g., the placement of a cellular telephone on the display surface). A stroke event may be defined as a touch event followed immediately by motion of the object initiating the touch event while the object remains in contact with the touch screen display 68. In other words, the stroke event may be defined by motion following a touch event thereby forming a continuous, moving touch event defining a moving series of instantaneous touch positions (e.g., as a drag operation or as a flick operation). Multiple strokes and/or touches may be used to define a particular shape or sequence of shapes to define a character. A pinch event may be classified as either a pinch out or a pinch in (hereinafter referred to simply as a pinch). A pinch may be defined as a multi-touch, where the touch events causing the multi-touch are spaced apart. After initial occurrence of the multi-touch event involving at least two objects, one or more of the objects may move substantially toward each other to simulate a pinch. Meanwhile, a pinch out may be defined as a multi-touch, where the touch events causing the multi-touch are relatively close together, followed by movement of the objects initiating the multi-touch substantially away from each other. In some cases, the objects on a pinch out may be so close together initially that they may be interpreted as a single touch, rather than a multi-touch, which then is modified by movement of two objects away from each other.

The gesture classifier 86 may also be configured to communicate detection information regarding the recognition, detection, and/or classification of a touch event to the display manager 84. The display manager 84 may be configured to provide control over modifications made to that which is displayed on the touch screen display 68 based on the detection information received from the detector 82 and gesture classifications provided by the gesture classifier 86 in accordance with the responses prescribed for each respective gesture classification and implementation characteristic determined by the gesture classifier 86. In other words, the display manager 84 may configure the display (e.g., with respect to the content displayed and/or the user interface effects presented relative to the content displayed) according to the gesture classification and implementation characteristic classification determined for a given touch event that may be detected at the display.

Figure 3:
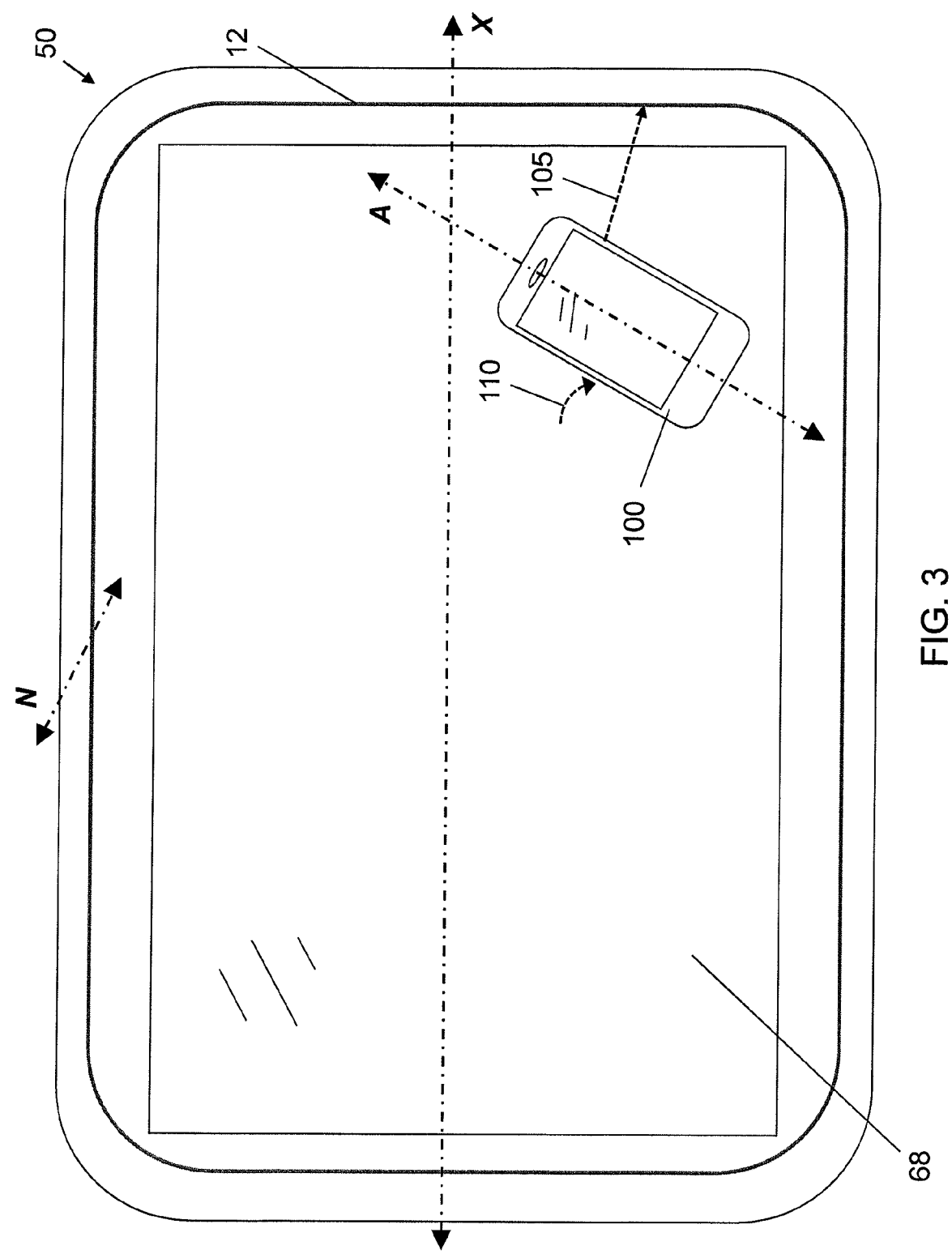
FIG. 3 illustrates an apparatus configured to determining the presence of a device for interaction via a display according to an example embodiment of the present invention, in which the device is disposed on the display.

Turning now to FIG. 3, in general, an apparatus 50, such as the mobile terminal 10 of FIG. 1, is provided that has (or is otherwise associated with) a touch screen display 68. As described above, the apparatus 50 may comprise at least one processor (e.g., processor 70 of FIG. 2) and at least one memory (e.g., memory device 76 of FIG. 2) including computer program code. The at least one memory and the computer program code may be configured to, with the processor, cause the apparatus 50 to at least receive a signal 105 from a device 100 proximate the apparatus and to receive a touch input 110 from the display 68. The signal 105 transmitted by the device 100, which is represented by dashed-line arrow in FIG. 3, may include a proximity component and an orientation component, as described below. The touch input 110 is represented by a curved dashed-line arrow in FIG. 3.

The at least one memory and the computer program code may be further configured to, with the processor, cause the apparatus 50 to determine whether there is an association between the signal 105 and the touch input 110 based on at least one of the proximity component or the orientation component. The association is indicative of the device 100 being disposed on the display 68, as shown in FIG. 3. An operation may then be executed based on the determination that the signal 105 and the touch input 110 are associated.

Figure 4:
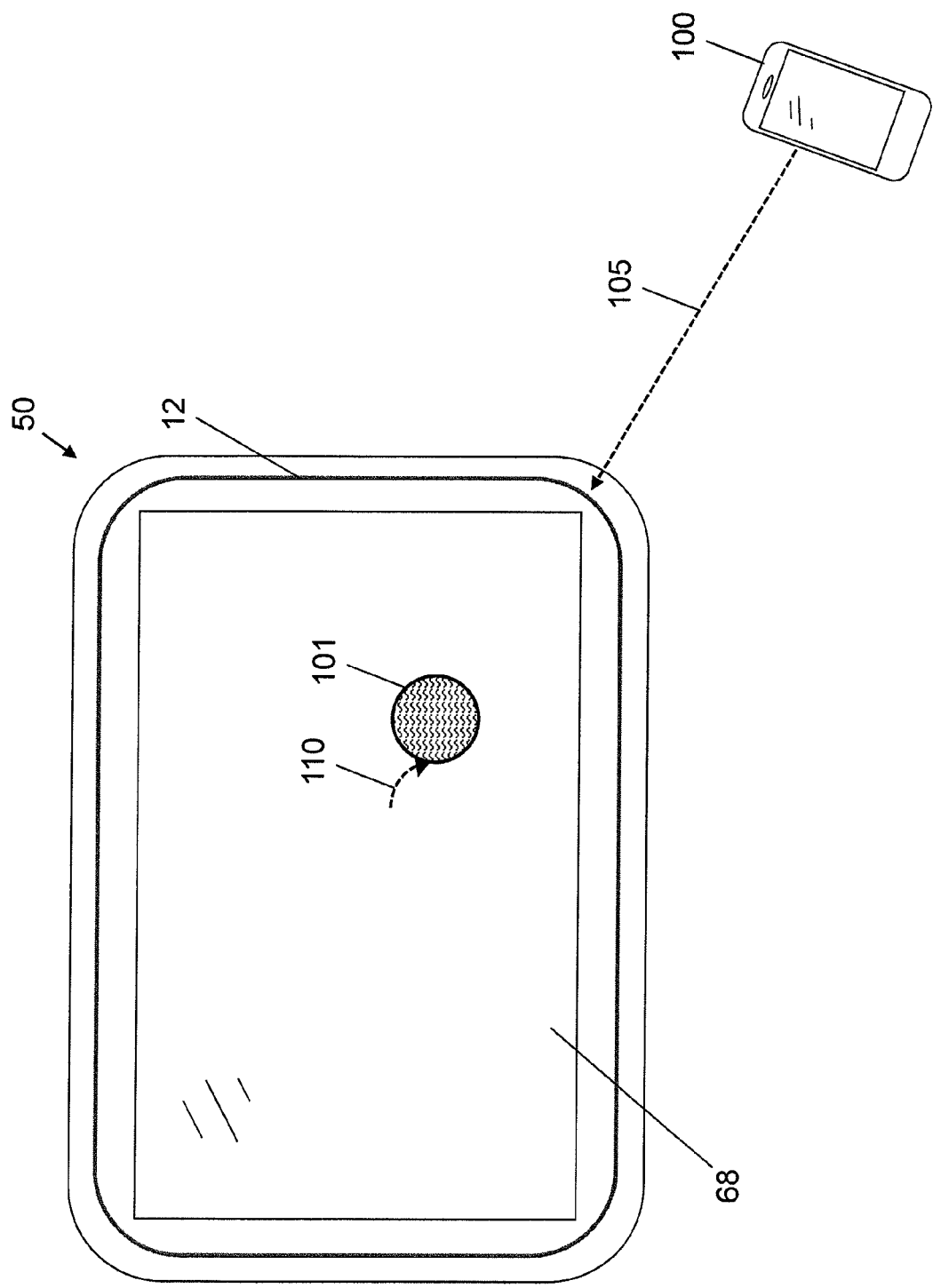
FIG. 4 shows the apparatus of FIG. 3 in the case where the device is spaced from the apparatus.

Said differently, rather than detect the presence of a tangible object (in this case, the device 100) using computer vision to "see" a fiducial marker located on the device, embodiments of the present invention are configured to detect a signal 105 transmitted by the device when the device is near the apparatus 50. For example, the apparatus 50 in the depicted embodiment of FIG. 3 includes or is in communication with an antenna 12 on the display 68 and is configured to receive RF, Bluetooth LE, or other NFC signals and relay them to the processor. The signal 105 may be received by the apparatus 50 regardless of whether the device 100 has actually been placed on the display 68 (e.g., based solely on a proximity to the apparatus). For example, in FIG. 4, the device 100 is spaced from the display 68 (e.g., the device may be a cellular phone carried in the pocket of someone standing near the apparatus 50). In this example, the display 68 may receive a touch input 110 that is unrelated to the device 100, such as a touch input that is the result of another object (e.g., a glass of water 101) being placed on the display. Because in FIG. 4 the signal 105 and the touch input 110 are not associated, the apparatus 50 would not interact with the device 100. In other words, because the proximity of the device 100 to the display 68 in FIG. 4 is incidental, and not the result of placement of the device on the display for the purpose of interacting with the device, the presence of the device may simply be ignored by the apparatus.

To determine whether a received signal 105 and a touch input 110 are associated (e.g., both caused by the device 100), the apparatus 50 may look to the content of the signal, such as to analyze information included in a proximity component and/or an orientation component of the signal. In this regard, the proximity component of the signal 105 may include information describing the proximity of the device 100 to another object, surface, or signal source. For example, the proximity component may indicate that a capacitance of a display of the device is disrupted (e.g., due to contact with or proximity to an object). Alternatively or additionally, the proximity component may be derived from the relative strength of the signal 105 (e.g., with a stronger signal indicating a closer proximity of the device to the apparatus). In some cases, the device 100 may be an NFC- or RFID-equipped device (e.g., the device may include an NFC or RFID tag), and the apparatus 50 may detect the device when the device (with the tag) is disposed on the display 68 of the apparatus. Thus, if the touch input 110 indicates that an object is contacting the display 68 of the apparatus 50, and the signal 105 includes a proximity component that indicates that the device 100 is also contacting an object, then a determination can be made that it is the device 100 that is in contact with (e.g., disposed on) the display 68.

Figure 5:
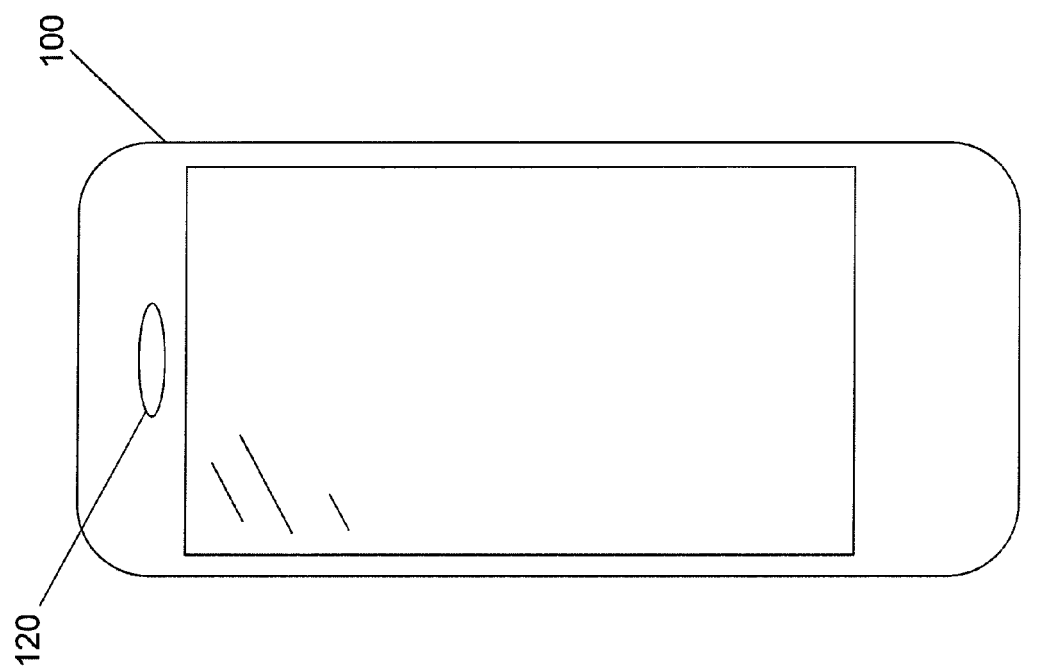
FIG. 5 shows the device of FIGS. 3 and 4 according to an example embodiment of the present invention.

Similarly, the signal 105 may include, instead of or in addition to the proximity component, an orientation component that provides information that can be used to determine the orientation of the device 100 with respect to the display 68. The orientation of the device 100 (e.g., the angle of a longitudinal axis A of the device with respect to a reference axis) may be determined in several ways. For example, the device 100 may include a magnetic sensor 120 (shown in FIG. 5) that senses the relative orientation of the device with respect to a known magnetic field. The magnetic field may, for instance, be the Earth's magnetic field, in which case the reference axis may extend in the direction of true north N. In other cases, the display 68 may include one or more (e.g., four) magnets 125 (shown in FIG. 6) for producing a magnetic field that serves as the known magnetic field (the reference axis, for example, shown as X in FIG. 3). Thus, the orientation component may include information that indicates the orientation of the device 100 with respect to the known magnetic field (e.g., a magnetic sensor reading).

In either case, the display 68 may also include or otherwise be associated with a magnetic sensor 121 (shown in FIG. 6) that can determine the relative orientation of the display with respect to a known magnetic field (e.g., the reference axis). Thus, by comparing the relative orientation of the device 100 with respect to the reference axis (X or N) with the relative orientation of the device 68 with respect to the reference axis (X or N), the orientation of the device 100 with respect to the display 68 may be determined.

In some embodiments, the orientation of the device 100 with respect to the display 68 may be determined by the apparatus 50, while in other embodiments the orientation of the device with respect to the display may be determined by the device (e.g., a processor of the device) through the receipt of orientation information from the apparatus. In still other cases, each of the device 100 and the apparatus 50 may be configured to determine its own orientation with respect to the other object, and these independent determinations may be exchanged (e.g., via an exchange of signals) to verify that the determined orientation is accurate.

The orientation of the device 100 with respect to the display 68 as determined via the orientation component may be used as an indication of whether the signal 105 is associated with the touch input 110. This may be done, for example, by detecting a position and an extent (e.g., area) of the touch input 110 on the display, such as through the use of force sensors 130 disposed beneath the display surface (shown in FIG. 6). By detecting the position and area covered by the object contacting the display 68, a presumed orientation of the contacting object may be determined. If the presumed orientation is found to match the actual orientation as indicated by the orientation component of the signal 105 received from the device 100 (or is within a certain acceptable tolerance), then the apparatus 50 may determine that there is an association between the signal 105 and the touch input 110 (e.g., the device 100 is actually the object that is contacting the display 68 and causing the touch input 110).

In some cases, the device 100 may include multiple conductive markers that are affixed to the device in a pattern and act as fiducials that represent the device's orientation. Thus, when the device 100 is placed on a display 68 that is equipped with a capacitive multi-touch sensor, for example, the sensed pattern of the conductive markers may serve as an indication of the orientation of the device with respect to the display 68 of the apparatus 50. Alternatively, instead of conductive markers, an arrangement of textured markers (e.g., "bumps") may be provided on the device 100 that apply pressure on certain areas of the display 68 or can be sensed by a display that is equipped with a resistive multi-touch sensor. Again, the sensed pattern of the markers may serve as an indication of the orientation of the device with respect to the display 68.

In addition to being used to determine whether there is an association between the signal 105 and the touch input 110 in certain embodiments, as described above, the orientation indicated by the orientation component may further be used in the invocation of certain functionality by the display 68 (e.g., to cause certain options to be displayed to the user via the display or allow certain operations to be executed, as described in greater detail below).

Figure 7:
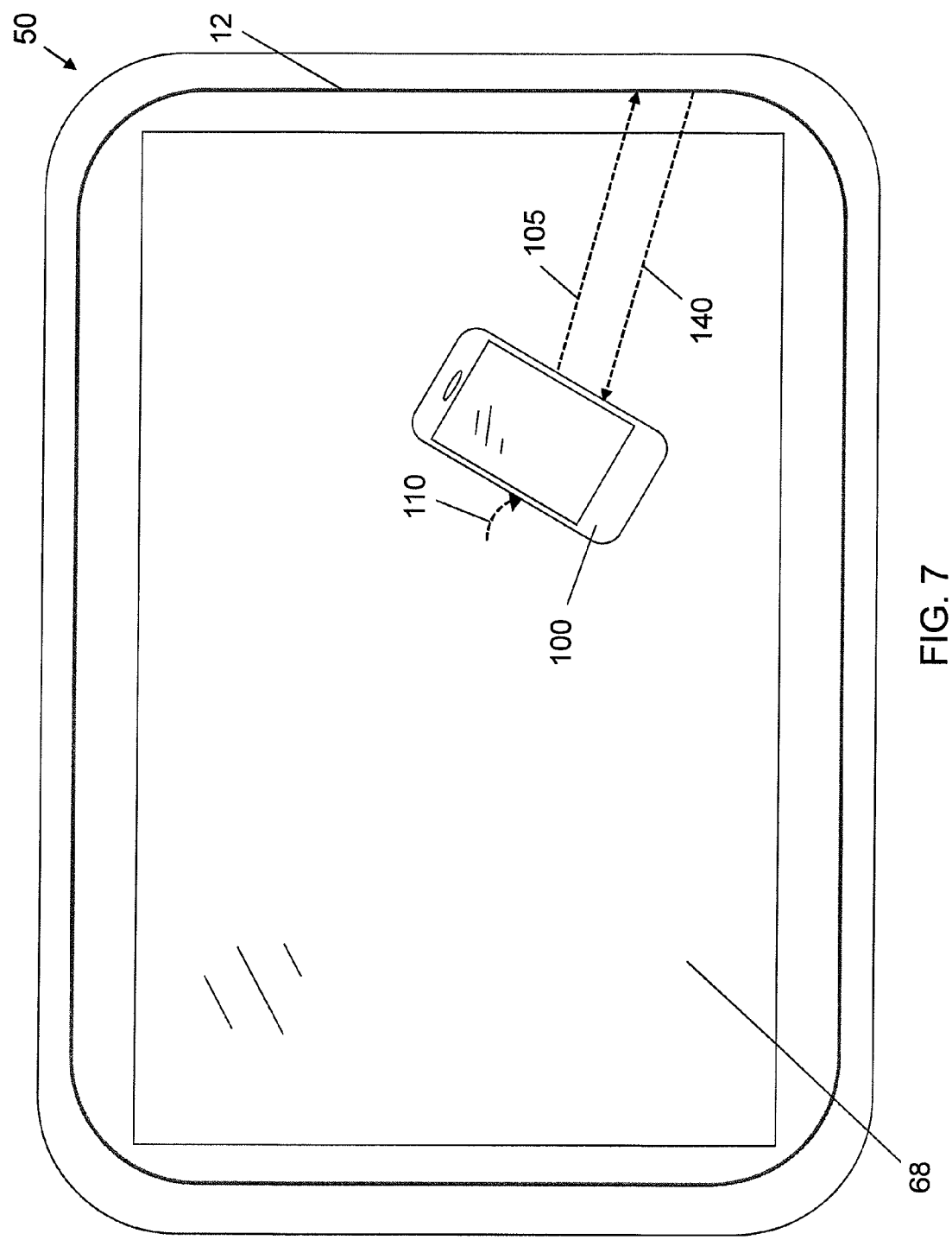
FIG. 7 illustrates an apparatus configured to determining the presence of a device for interaction via a display according to an example embodiment of the present invention, in which the signal is transmitted by the device in response to an inquiry signal from the apparatus.

The signal 105 may be received from the device 100 based solely on the fact that the device 100 has come within a certain distance of the apparatus, or the signal 105 may be received in response to an inquiry signal. In the case of the former, the device 100 may be configured to continuously transmit a signal 105 including, for example, a proximity component and/or an orientation component. Thus, once the device 100 is within range of the apparatus 50 (or, more specifically, a receiver, such as the antenna 12, of the apparatus), the signal 105 may be received. Alternatively, the apparatus 50 may be configured to periodically or continuously transmit an inquiry signal 140 (shown in FIG. 7) that requests transmission, by any device in the vicinity, of a response signal in the form of the signal 105. In this case, the device 100 need not be constantly transmitting the signal 105 including the proximity component and/or the orientation component, but rather only when requested.

Thus, in some embodiments, the memory and computer program code are configured to, with the processor, cause the apparatus to transmit an inquiry signal 140, and the signal 105 received from the device 100 may thus by transmitted by the device in response to the inquiry signal. Furthermore, in some embodiments the inquiry signal 140 may be continuously transmitted, whereas in other cases the inquiry signal is transmitted only in response to the receipt of the touch input 110. In other words, in cases where the inquiry signal 140 is not continuously transmitted, the transmission of the inquiry signal may be invoked by the receipt of a touch input 110 at the display 68 (e.g., as a way to confirm whether the touch input was caused by the device 100 or by some other, unrelated object). In still other cases, the touch input 110 may be received in response to the receipt of the signal 105 from the device 100. For example, once a signal 105 transmitted by the device 100 is received by the apparatus 50, force sensors 130 (shown in FIG. 6) disposed beneath a surface of the display 68 may be queried to ascertain whether a touch input 110 has also been received.

Figure 6:
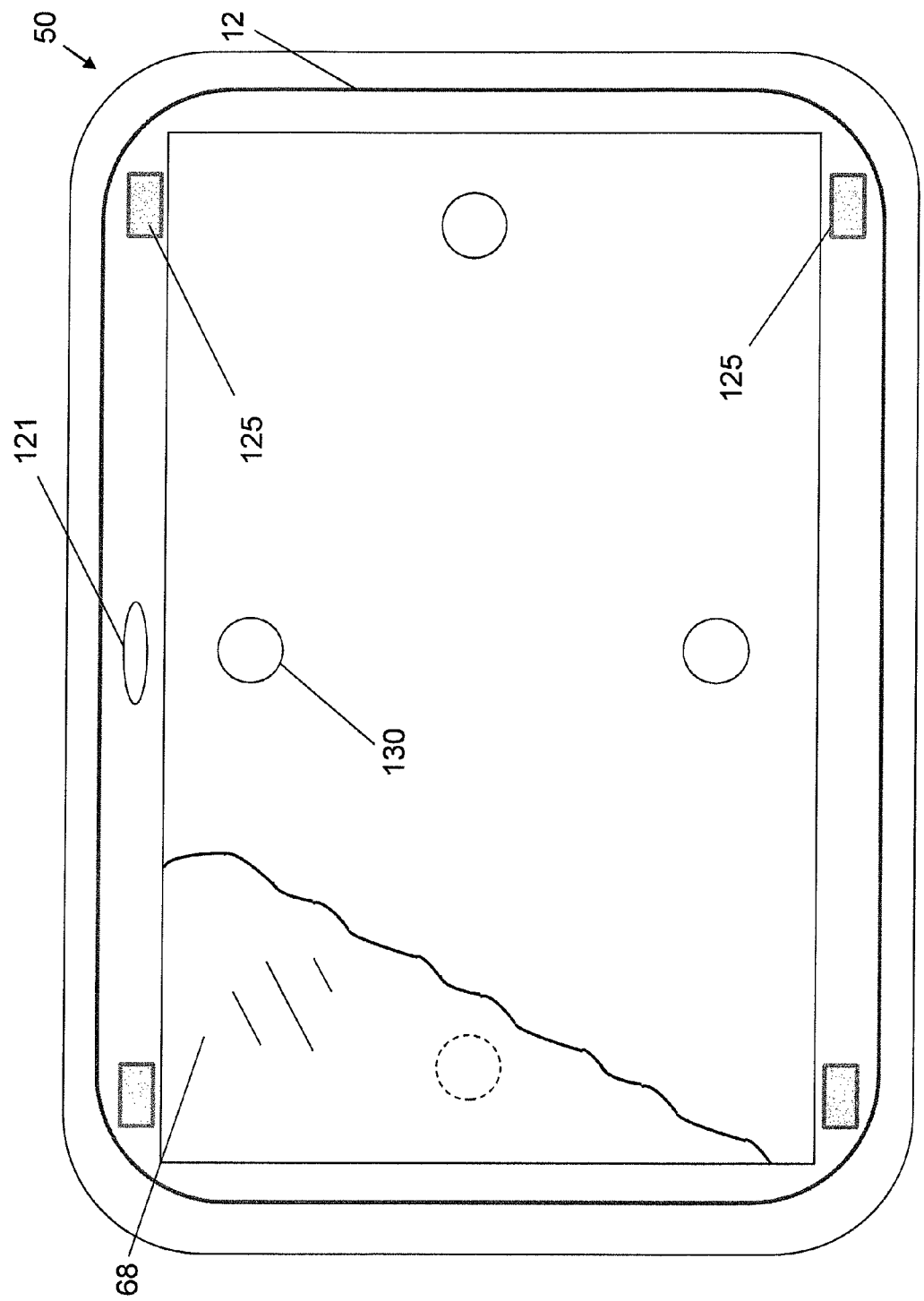
FIG. 6 shows an apparatus according to an example embodiment of the present invention, in which a portion of the display is removed.

As noted above, the touch input 110 may be any input received at the display 68 of the apparatus 50 that is indicative of an object coming into contact with (or disposed very close to) the display. For example, in embodiments in which the display 68 includes force sensors 130, as shown in FIG. 6, the touch input may comprises the detection of a force applied to the display (e.g., due to the weight of the object and/or the force applied by the user in setting the object down onto the display). In other cases, the touch input 110 may comprise information received from a capacitive or resistive touch sensor (not shown) that is associated with the display 68. Such information may, for example, indicate that a known, predefined capacitance or resistance of the display 68 has been changed, presumably due to an object contacting or otherwise coming very close to the display.

To facilitate interaction between the apparatus 50 and the device 100 once it is determined that the signal 105 and the touch input 110 are associated, additional information regarding the device may be received and/or processed by the apparatus. For example, the signal 105 transmitted by the device 100 and received by the apparatus 50 may further include an identity component, which describes the identity of the device (e.g., whether the device is a cellular telephone or a digital camera), its functional capabilities, the type of data stored on the device, the device's preferred method of communication and/or data exchange, the device's wireless address (e.g., Bluetooth address), and/or other information about the device that may facilitate interaction with the device. Thus, the memory and computer program code may be configured to, with the processor, cause the apparatus 50 to exchange data with the device at least partly based on the identity component. Although the identity component may be part of the original signal 105 received from the device (e.g., with the proximity component and/or the orientation component), in other cases the identity component may be provided in a subsequent transmission by the device 100, for example, in response to a specific inquiry by the apparatus.

Figure 8:
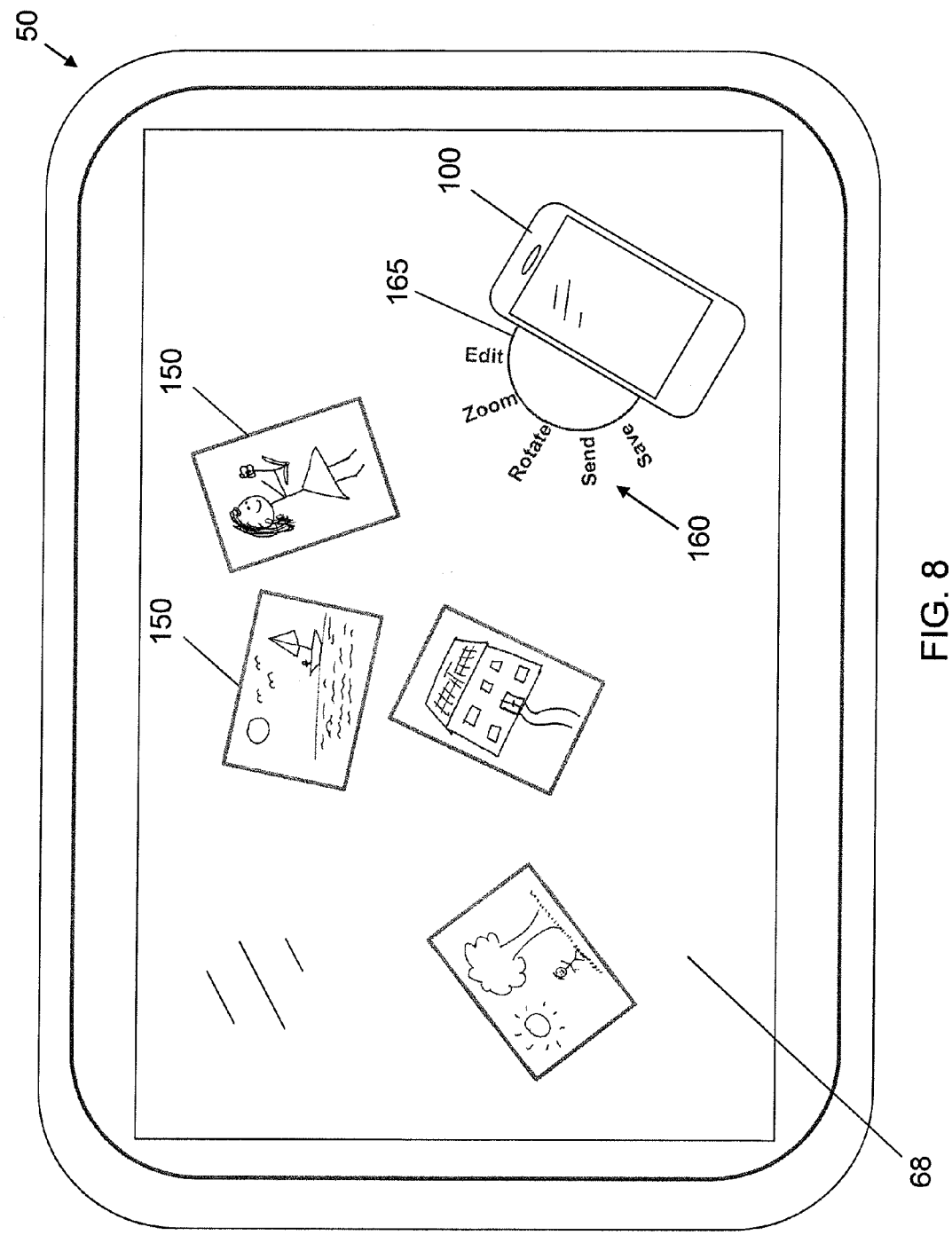
FIGS. 8 and 8A illustrate an example of interaction between the apparatus and the device.
Figure 8A:
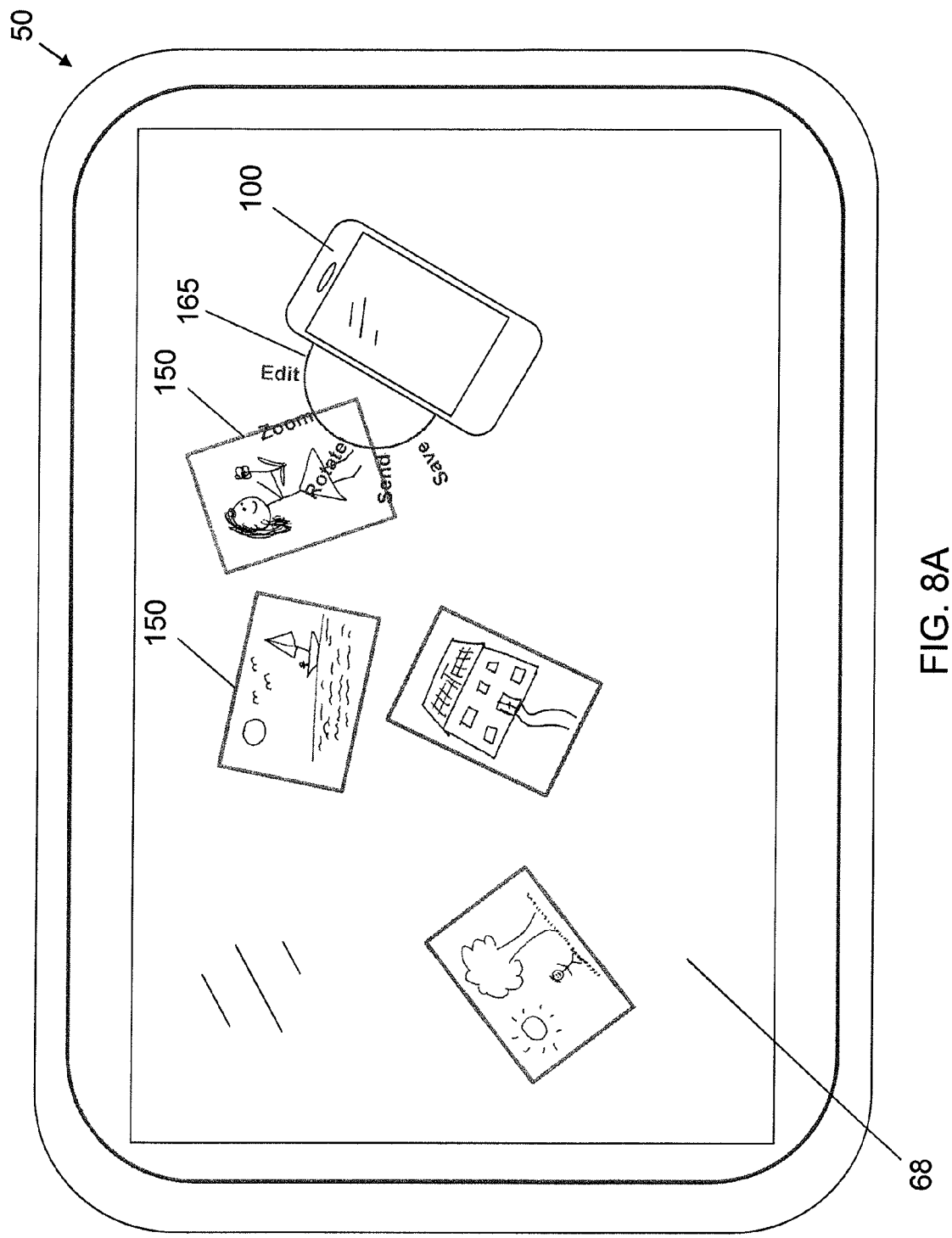

Turning now to FIGS. 8 and 8A, an example is provided that demonstrates operations that may be executed and interactions that may occur between the apparatus 50 and the device 100 once it is determined that there is an association between a signal 105 received from the device and a touch input received at the display 68. In this example, the device 100 is a cellular telephone that has digital pictures stored in a memory of the phone. When the phone 100 is placed on the display 68 (in this example) a signal from the phone is received that includes a proximity component and an orientation component, and a touch input is received from the display. Based on the proximity component and/or the orientation component, the apparatus 50 determines that, in this case, the signal and the touch input are associated. In other words, the phone 100 is actually disposed on the display 68. As a result, interaction between the apparatus 50 and the phone 100 is allowed.

In the depicted example of FIG. 8, the apparatus causes several pictures 150 that are stored on the phone 100 to be displayed on the display 68 for the user to view. The apparatus may obtain the content to display by establishing a wireless connection with the device, e.g., using a Bluetooth address of the device as specified in an identity component provided by the device. The user may be able to move the pictures 150 around the display 68, for example to spread them out or to place them in a certain order for easier viewing, by directly interacting with the display 68 (e.g., using a finger or stylus to provide touch inputs to the display). Moreover, a list of user options may be displayed on the display 68 that relate to the data being viewed and/or manipulated. Continuing the above example, the user may be presented with an options wheel 160 with options to "edit," "zoom," "rotate," "send," or "save" one or more of the displayed images. One or more of the displayed options may be selected by the user through direct contact with the display 68 in the form of a touch input applied to the display.

In some cases, the orientation of the device 100 (e.g., determined with reference to the orientation component as described above) may inform or facilitate the function requested by the user. For example, if the user in FIG. 8 wishes to send a certain picture 150 to a friend's e-mail address, the user may simply move the phone 100 towards the selected picture until the displayed arc 165 intersects with the picture to be sent, as shown in FIG. 8A. Once at least a portion of the picture 150 is within the arc 165, the user may touch the "send" option, and a text box may appear on the display 68 requesting that the user use a virtual keyboard to type in the requested recipient's e-mail address and message (or, alternatively, to "write" the information using a series of touch strokes signifying letters and numbers). Thus, the orientation component included in the signal received from the device (both initially, when the device 100 is first placed on the display 68, and subsequently, as the device is moved toward the desired picture) may be useful to the apparatus in determining which picture the user intends to send to a friend in this example. Various other functions, applications, and devices may also benefit from embodiments of the invention described above, with the simple depicted embodiments being selected only for the purpose of explanation.

In some cases, the apparatus 50 may execute operations based on the determination that the signal 105 received from the device and the touch input 110 received at the display 68 are associated, without necessarily interacting with the device 100. For example, in some applications, such as in gaming applications, the device 100 may represent the user as a player in a game. In other words, placement of the device 100 on the display 68 of the apparatus 50 may be comparable to the placement of a game piece on a game board. Thus, several users may place their devices on a "game board" presented on the display 68, and, following a determination that signals received from the devices are associated to respective touch inputs, the apparatus 50 may execute operations related to the progress of a computer game displayed on the display involving the players represented by the "game pieces" (the devices). In this example, the devices may thus be considered tokens representing each respective user, and the apparatus may execute operations based on the determinations described above, independent of the device itself.

Figure 9:
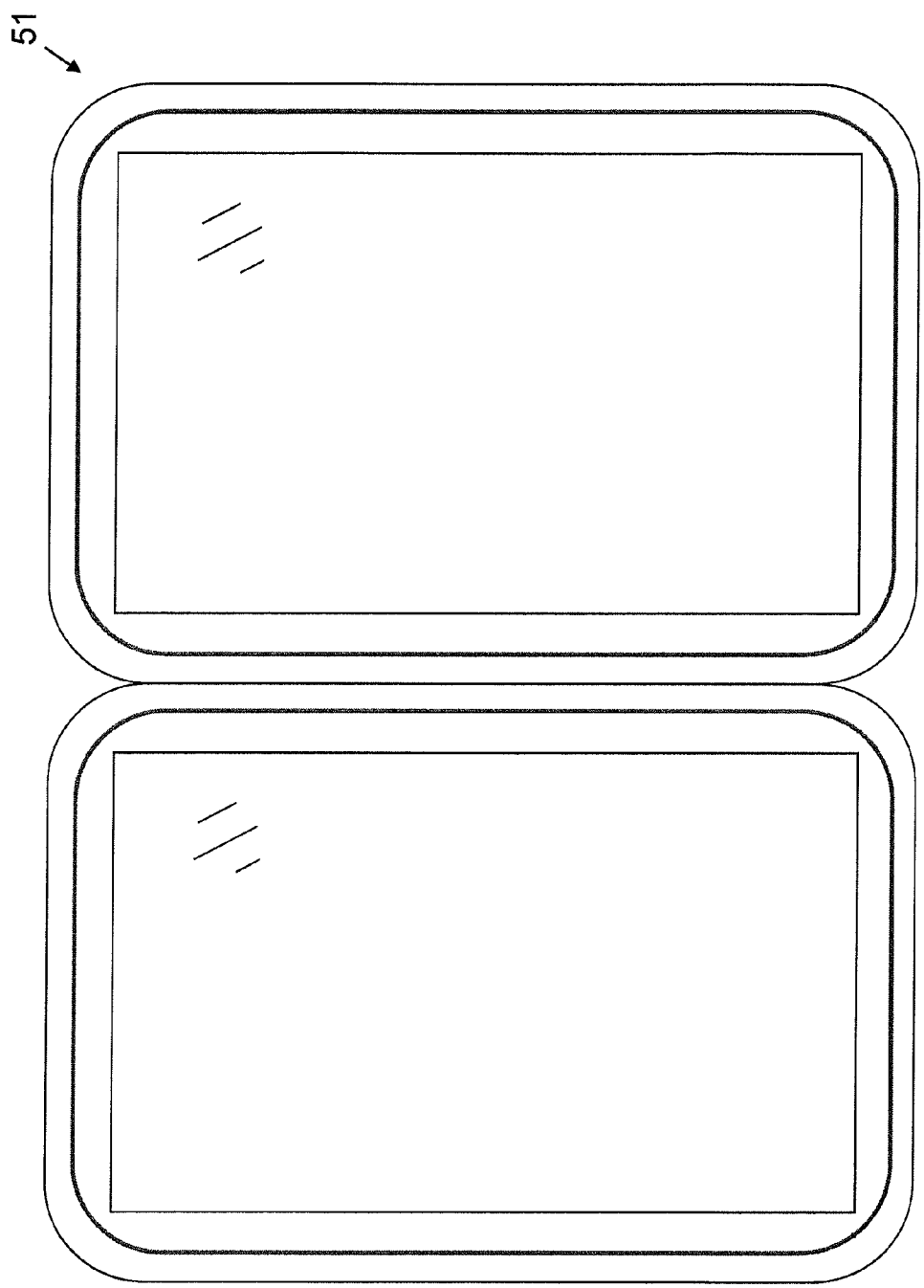
FIG. 9 illustrates an apparatus configured to determine the presence of a device for interaction via dual displays according to an example embodiment of the present invention.

Furthermore, although a single-display apparatus is shown in FIGS. 3-8A, apparatuses of various sizes and configurations may benefit from the embodiments described above. For example, in FIG. 9, a hinged, dual-display touch screen apparatus 51 is shown that may also be configured according to the embodiments described above.

Figure 10:
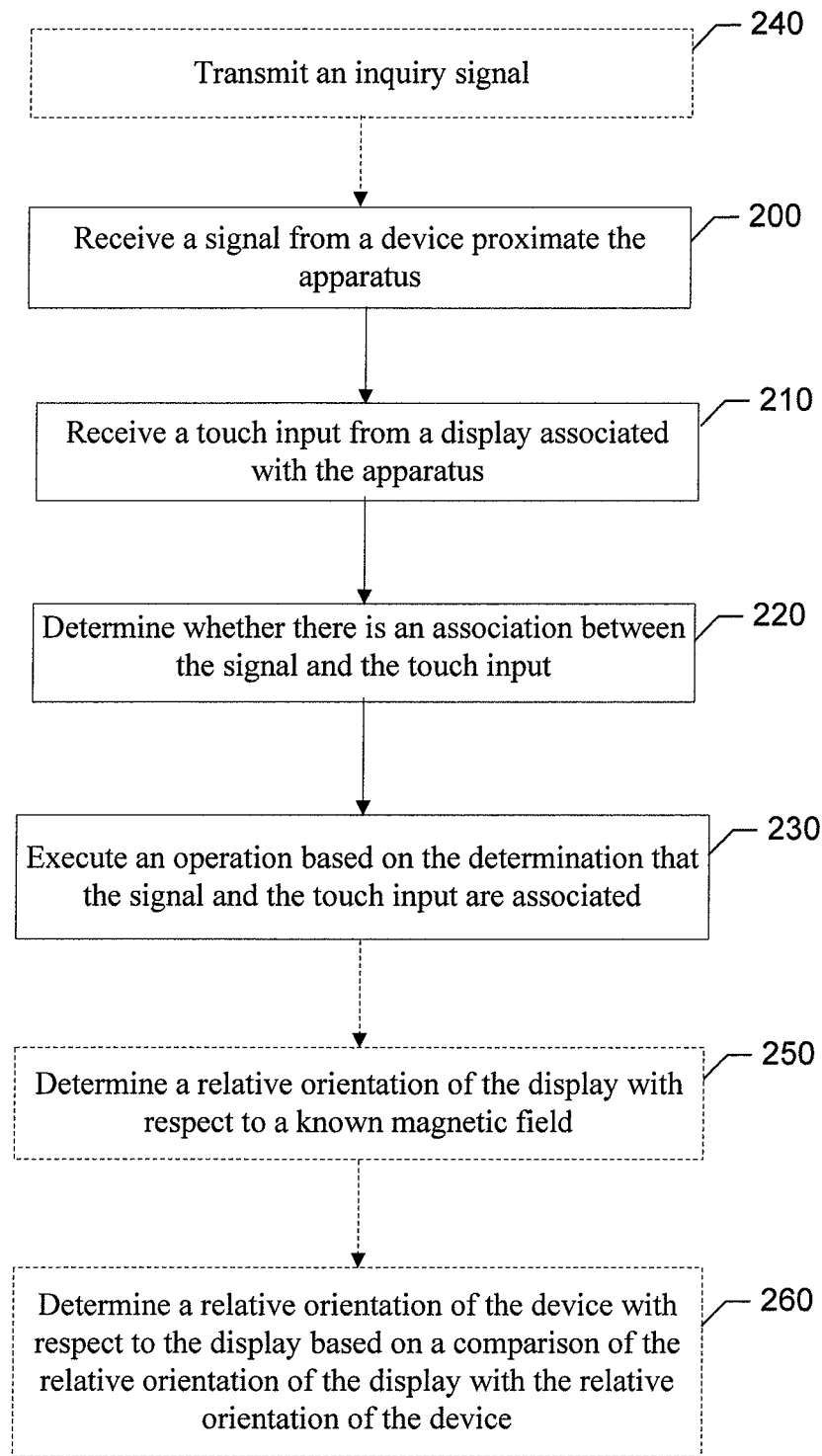
FIG. 10 illustrates a flowchart of methods of determining the presence of a device for interaction in accordance with another example embodiment of the present invention.

FIG. 10 illustrates a flowchart of a system, method, and computer program product according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus implements the functions specified in the flowchart block(s). These computer program instructions may also be stored in a computer-readable memory that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

Accordingly, blocks of the flowchart support combinations of means for performing the specified functions, combinations of operations for performing the specified functions, and program instruction means for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, one embodiment of a method for determining the presence of a device for interaction via a display based on an association between a signal received from the device and a touch input to the display, as shown in FIG. 10, includes receiving a signal from a device proximate an apparatus at Block 200, wherein the signal includes at least one of a proximity component or an orientation component. The method further includes receiving a touch input from a display associated with the apparatus at Block 210 and determining, via a processor, whether there is an association between the signal and the touch input based on at least one of the proximity component or the orientation component at Block 220, where the association is indicative of the device being disposed on the display. Furthermore, at Block 230, an operation may be executed based on the determination that the signal and the touch input are associated.

In some cases, an inquiry signal is transmitted at Block 240 as described above, wherein the signal received from the device is transmitted by the device in response to the inquiry signal. The inquiry signal may be transmitted in response to the receipt of the touch input. Alternatively, the touch input may be received in response to the receipt of the signal from the device, as described above.

In still other embodiments, a relative orientation of the display with respect to a known magnetic field may be determined at Block 250, as provided above. The orientation component in such cases may comprise an indication of a relative orientation of the device with respect to the known magnetic field. Thus, in Block 260, an orientation of the device with respect to the display may be determined based on a comparison of the relative orientation of the display with the relative orientation of the device.

In some embodiments, certain ones of the operations above may be modified or further amplified as described below. Furthermore, in some embodiments, additional optional operations may be included, some examples of which are shown in dashed lines in FIG. 10. Modifications, additions, or amplifications to the operations above may be performed in any order and in any combination.

In an example embodiment, an apparatus for performing the method of FIG. 10 above may comprise a processor (e.g., the processor 70 of FIG. 2) configured to perform some or each of the operations (200-260) described above. The processor may, for example, be configured to perform the operations (200-260) by performing hardware implemented logical functions, executing stored instructions, or executing algorithms for performing each of the operations. Alternatively, the apparatus may comprise means for performing each of the operations described above. In this regard, according to an example embodiment, examples of means for performing at least portions of operation 210 may comprise, for example, the user interface transceiver 72, the processor 70, and/or a device or circuit for executing instructions or executing an algorithm for processing information as described above.

Examples of means for performing operation 230 may comprise, for example, the user interface transceiver 72, the processor 70, the memory device 76, and/or a device or circuit for executing instructions or executing an algorithm for processing information as described above. Examples of means for performing operations 200 and 240 may comprise, for example, the communication interface 74, the processor 70, and/or a device or circuit for executing instructions or executing an algorithm for processing information as described above. Moreover, examples of means for performing at least portions of operations 220, 250, and 260 may comprise, for example, the processor 70 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising at least one processor and at least one memory including computer program code, the at least one memory and the computer program code configured to, with the processor, cause the apparatus to at least:
   receive a signal transmitted by a device proximate the apparatus, wherein the signal includes at least one of a proximity component or an orientation component;
   receive a touch input resulting from contact between an object and a display associated with the apparatus;
   determine whether the object causing the touch input is the device that transmitted the signal by determining whether there is an association between the signal and the touch input based on at least one of the proximity component or the orientation component, wherein the association is indicative of the device being disposed on the display;
   receive content from the device in response to the determination that there is an association between the signal and the touch input;
   provide for presentation of the content on the display associated with the apparatus;
   provide for presentation of a list of user options on the display; and
   perform an action on the content based at least in part on movement of the device with respect to the display associated with the apparatus and with respect to the content presented thereon, wherein contact between the device and the display associated with the apparatus is maintained during the movement of the device, and wherein the action is performed on the content based at least in part on selection of one of the user options.

2. The apparatus of claim 1, wherein the signal received from the device is a radio frequency signal.

3. The apparatus of claim 1, wherein the memory and computer program code are configured to, with the processor, cause the apparatus to transmit an inquiry signal, and wherein the signal transmitted by the device is transmitted in response to the inquiry signal.

4. The apparatus of claim 3, wherein the inquiry signal is transmitted in response to the receipt of the touch input.

5. The apparatus of claim 1, wherein the touch input is received in response to the receipt of the signal transmitted by the device.

6. The apparatus of claim 1, wherein the touch input comprises detection of a force applied to the display.

7. The apparatus of claim 1, wherein the touch input comprises information received from a capacitive or resistive touch sensor associated with the display.

8. The apparatus of claim 1, wherein the signal received from the device includes an identity component, wherein the memory and computer program code are configured to, with the processor, cause the apparatus to exchange data with the device at least partly based on the identity component.

9. The apparatus of claim 1, wherein the memory and computer program code are configured to, with the processor, cause the apparatus to determine a relative orientation of the display with respect to a known magnetic field.

10. The apparatus of claim 9, wherein the orientation component comprises an indication of a relative orientation of the device with respect to the known magnetic field, and wherein the memory and computer program code are configured to, with the processor, cause the apparatus to determine an orientation of the device with respect to the display based on a comparison of the relative orientation of the display with the relative orientation of the device.

11. A method comprising:
receiving a signal transmitted by a device proximate an apparatus, wherein the signal includes at least one of a proximity component or an orientation component;
receiving a touch input resulting from contact between an object and a display associated with the apparatus;
determining, via a processor, whether the object causing the touch input is the device that transmitted the signal by determining whether there is an association between the signal and the touch input based on at least one of the proximity component or the orientation component, wherein the association is indicative of the device being disposed on the display;
receiving content from the device in response to the determination that there is an association between the signal and the touch input;
providing for presentation of the content on the display associated with the apparatus;
providing for presentation of a list of user options on the display; and
performing an action on the content based at least in part on movement of the device with respect to the display associated with the apparatus and with respect to the content presented thereon, wherein contact between the device and the display associated with the apparatus is maintained during the movement of the device, and wherein the action is performed on the content based at least in part on selection of one of the user options.

12. The method of claim 11 further comprising transmitting an inquiry signal, wherein the signal transmitted by the device is transmitted in response to the inquiry signal.

13. The method of claim 12, wherein the inquiry signal is transmitted in response to the receipt of the touch input.

14. The method of claim 11, wherein the touch input is received in response to the receipt of the signal transmitted by the device.

15. The method of claim 11 further comprising determining a relative orientation of the display with respect to a known magnetic field.

16. The method of claim 15, wherein the orientation component comprises an indication of a relative orientation of the device with respect to the known magnetic field, and wherein the method further comprises determining an orientation of the device with respect to the display based on a comparison of the relative orientation of the display with the relative orientation of the device.

17. A computer program product comprising at least one non-transitory computer-readable storage medium having computer-executable program code portions stored therein, the computer-executable program code portions comprising program code instructions for:
receiving a signal transmitted by a device, wherein the signal includes at least one of a proximity component or an orientation component;
receiving a touch input resulting from contact between an object and a display;
determining whether the object causing the touch input is the device that transmitted the signal by determining whether there is an association between the signal and the touch input based on at least one of the proximity component or the orientation component, wherein the association is indicative of the device being disposed on the display;
receiving content from the device in response to the determination that there is an association between the signal and the touch input;
providing for presentation of the content on the display;
providing for presentation of a list of user options on the display; and
performing an action on the content based at least in part on movement of the device with respect to the display and with respect to the content presented thereon, wherein contact between the device and the display is maintained during the movement of the device, and wherein the action is performed on the content based at least in part on selection of one of the user options.

18. The computer program product of claim 17 further comprising program code instructions for transmitting an inquiry signal, wherein the signal transmitted by the device is transmitted in response to the inquiry signal.

19. The computer program product of claim 18, wherein the inquiry signal is transmitted in response to the receipt of the touch input.

20. The computer program product of claim 17, wherein the touch input is received in response to the receipt of the signal transmitted by the device.

21. The computer program product of claim 17 further comprising program code instructions for determining a relative orientation of the display with respect to a known magnetic field.

22. The computer program product of claim 21, wherein the orientation component comprises an indication of a relative orientation of the device with respect to the known magnetic field, and wherein further comprising program code instructions for determining an orientation of the device with respect to the display based on a comparison of the relative orientation of the display with the relative orientation of the device.

* * * * *